United States Patent
Gupta et al.

(10) Patent No.: US 11,390,833 B2
(45) Date of Patent: Jul. 19, 2022

(54) AERATING SYSTEMS, APPARATUSES, AND METHODS

(71) Applicant: Jetstream Wine Technologies, Inc., North Reading, MA (US)

(72) Inventors: Chakra V. Gupta, Lenoir, NC (US); Cheryl Gaeta, Reading, MA (US); David Kmetz, Douglas, MA (US); Michael J. Pelosi, Winthrop, MA (US)

(73) Assignee: Jetstream Wine Technologies, Inc., North Reading, MA (US)

( * ) Notice: Subject to any disclaimer, the term of this patent is extended or adjusted under 35 U.S.C. 154(b) by 33 days.

(21) Appl. No.: 16/356,121

(22) Filed: Mar. 18, 2019

(65) Prior Publication Data
US 2019/0209979 A1    Jul. 11, 2019

Related U.S. Application Data

(63) Continuation of application No. 15/612,211, filed on Jun. 2, 2017, now Pat. No. 10,258,939, which is a
(Continued)

(51) Int. Cl.
*B01F 23/2361* (2022.01)
*C12G 1/00* (2019.01)
(Continued)

(52) U.S. Cl.
CPC ............ *C12G 1/00* (2013.01); *B01F 23/2361* (2022.01); *B01F 25/434* (2022.01);
(Continued)

(58) Field of Classification Search
CPC .......... B01F 2215/0072; B01F 3/04794; B01F 13/002; B01F 5/0644; B01F 5/0669; B01F 5/0676; B01F 3/04815; B01F 5/0475; B01F 3/04787; B01F 3/04007; B01F 3/0446; B01F 3/04099; B01F 3/04; B01F 5/04;
(Continued)

(56) References Cited

U.S. PATENT DOCUMENTS

| 3,091,373 A | 5/1963 | Kirschenbaum |
| D631,291 S | 1/2011 | Kushner |

(Continued)

FOREIGN PATENT DOCUMENTS

| BE | 481212 A | 4/1948 |
| EP | 1882515 A1 | 1/2008 |
| WO | 2016/090374 A1 | 6/2016 |

OTHER PUBLICATIONS

Definition Hole, Cambridge Dictionary, https://dictionary.cambridge.org/us/dictionary/english/hole, retrieved online Sep. 9, 2021 (Year: 2021).*

(Continued)

*Primary Examiner* — Hong T Yoo
(74) *Attorney, Agent, or Firm* — Duane Morris LLP

(57) ABSTRACT

An apparatus includes a body having a length extending from a first end to a second end. The body defines a bore extending through the entirety of the body and at least one of a plurality of grooves or holes around the bore. The body has a length that is dimensioned to be received entirely within a neck of a container.

20 Claims, 7 Drawing Sheets

Related U.S. Application Data continuation-in-part of application No. PCT/US2015/064312, filed on Dec. 7, 2015, and a continuation-in-part of application No. 14/960,590, filed on Dec. 7, 2015, now Pat. No. 10,258,938.

(60) Provisional application No. 62/456,822, filed on Feb. 9, 2017, provisional application No. 62/147,517, filed on Apr. 14, 2015, provisional application No. 62/088,594, filed on Dec. 6, 2014.

(51) Int. Cl.
| | | |
|---|---|---|
| *B65D 1/02* | (2006.01) | |
| *B65D 23/04* | (2006.01) | |
| *C12H 1/14* | (2006.01) | |
| *B01F 25/434* | (2022.01) | |
| *B01F 25/432* | (2022.01) | |
| *B01F 25/441* | (2022.01) | |
| *B01F 23/237* | (2022.01) | |
| *B01F 101/17* | (2022.01) | |

(52) U.S. Cl.
CPC .... *B01F 25/4323* (2022.01); *B01F 25/44161* (2022.01); *B01F 25/44167* (2022.01); *B65D 1/023* (2013.01); *B65D 23/04* (2013.01); *C12H 1/14* (2013.01); *B01F 23/237611* (2022.01); *B01F 2101/17* (2022.01)

(58) Field of Classification Search
CPC ...... B01F 5/06; B01F 23/236; B01F 23/2366; B01F 23/2361; B67D 3/00; C65D 24/40; B65D 25/40; B65D 1/02
See application file for complete search history.

(56) References Cited

U.S. PATENT DOCUMENTS

| | | |
|---|---|---|
| D633,745 S | 3/2011 | Ross |
| D635,823 S | 4/2011 | Mauffette |
| D681,393 S | 5/2013 | Agarwal |
| 8,727,324 B2 | 5/2014 | Borden |
| 8,783,665 B2 | 7/2014 | Kuru |
| 8,807,358 B2 | 8/2014 | Devoy |
| D712,199 S | 9/2014 | Borden |
| D741,645 S | 10/2015 | Lau |
| 9,283,526 B2 | 3/2016 | Smith |
| 9,399,197 B2 | 7/2016 | Graham |
| 9,463,423 B2 | 10/2016 | Borden |
| D772,004 S | 11/2016 | Khan |
| 9,486,754 B2 | 11/2016 | Foldesi, Jr |
| 10,258,939 B2 * | 4/2019 | Gupta ................ B01F 3/04794 |
| 2006/0204414 A1 | 9/2006 | Warner et al. |
| 2010/0091605 A1 | 4/2010 | Rasmussen et al. |
| 2010/0124594 A1 | 5/2010 | Burroughs et al. |
| 2012/0074092 A1 | 3/2012 | Devoy et al. |
| 2012/0156345 A1 | 6/2012 | Agarwal et al. |
| 2013/0319253 A1 | 12/2013 | Smith |
| 2016/0175782 A1 | 6/2016 | Lau |
| 2019/0209978 A1 * | 7/2019 | Gaeta ................... B01F 5/0676 |

OTHER PUBLICATIONS

International Search Report/Written Opinion dated Apr. 21, 2016, in counterpart Intl. Application No. PCT/US2015/64312.
International Search Report/Written Opinion issued in corresponding Intl. Application No. PCT/US2018/016792, 11 pages.
European Search Report dated Jun. 22, 2018, in corresponding EP Patent Application No. 15866325.2.

* cited by examiner

AERATING SYSTEMS, APPARATUSES, AND METHODS

CROSS-REFERENCE TO RELATED APPLICATIONS

This is application is a continuation of U.S. patent application Ser. No. 15/612,211, filed Jun. 2, 2017, now U.S. Pat. No. 10,258,939 B2 which is a continuation-in-part of International Patent Application No. PCT/US2015/64312, filed Dec. 7, 2015, claiming priority to U.S. Provisional Patent Application No. 62/088,594, filed Dec. 6, 2014, and to U.S. Provisional Patent Application No. 62/147,517, filed Apr. 14, 2015; U.S. patent application Ser. No. 15/612,211 is also a continuation-in-part of U.S. patent application Ser. No. 14/960,590, filed Dec. 7, 2015, now U.S. Pat. No. 10,258,938 B2 claiming priority to U.S. Provisional Patent Application No. 62/088,594, filed Dec. 6, 2014, and to U.S. Provisional Patent Application No. 62/147,517, filed Apr. 14, 2015; and U.S. patent application Ser. No. 15/612,211 also claims priority to U.S. Provisional Patent Application No. 62/456,822, filed Feb. 9, 2017, the entireties of which are incorporated by reference herein.

BACKGROUND

Some beverages, including tannin- and polyphenol-containing beverages such as wine and whiskey, benefit from "breathing," i.e., being exposed to air, prior to drinking. One conventional method of breathing includes pouring the liquid beverage from its bottle or other container into a decanter where the liquid is exposed to air. However, such process normally takes considerable time and can be inconvenient.

SUMMARY

In some embodiments, an apparatus includes a body having a length extending from a first end to a second end. The body defines a bore extending through the entirety of the body and at least one of a plurality of grooves or holes around the bore. The body has a length that is dimensioned to be received entirely within a neck of a container.

In some embodiments, a system includes a container including a neck and an aerator disposed entirely within the container and at least partially within the neck. The aerator includes a body having a length extending from a first end to a second end. The body defines a bore extending through the entirety of the body and at least one of a plurality of grooves or holes around the bore.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
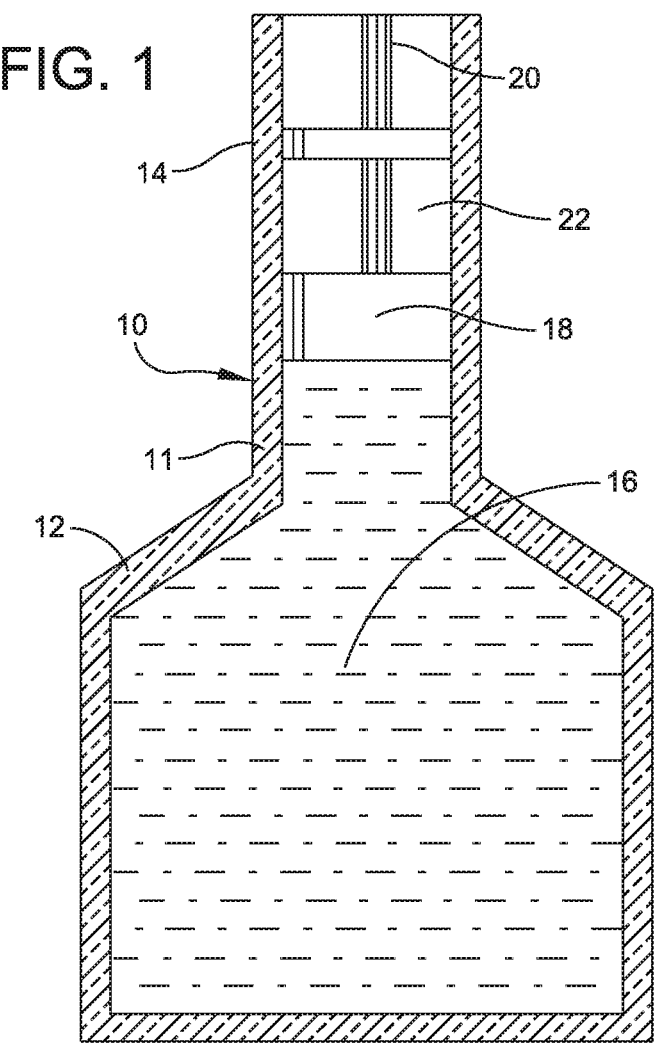
FIG. 1 is a sectional front elevation view, taken along line 1-1 of FIG. 1A, of a container system for liquids, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Despite the huge boost in wine consumption in the past decade, knowledge of the intricacies and ritual of wine drinking devised, in most cases, for long bottled vintages to achieve proper taste. The disclosed aerating systems and methods will benefit various beverage produces, including producers of wines and spirits that include tannins and polyphenols. Examples of such wines including, but are not limited to, cabernet sauvignon, nebbiolo, syrah, tannat, zinfandel, and merlot, to list only a few examples. Beverages of this nature are designed with the knowledge that proper oxidation or aeration of the beverage will lead to the peak flavor, aroma and overall enjoyment. Advantageously, the disclosed systems can be incorporated into conventional beverage containers, such as wine bottles, by the producers in the pre-market, or the disclosed systems can be incorporated into the containers by consumers in the after-market.

The disclosed systems, apparatuses, and methods includes an aerator for positioning entirely within the "throat" of a bottle or container. The disclosed aerators allow liquid to be poured from the container while creating turbulence within the bottle. In some embodiments, the aerator includes a cylindrical body having an external surface—e.g., container-contacting surface—defining one or more grooves and a bore. The groove(s) advantageously enable reduce the amount of force required to insert the aerator into a container as well as provide conduit(s) for air to enter the container while the liquid is being poured out as described in greater detail below. In some embodiments, the external surface of the body is smooth and one or more holes are provided around the central axial bore. Combinations of grooves and holes also can be provided. In some embodiments, the aerator has a symmetrical configuration such that the liquid is aerated regardless of the orientation of the container as the pouring occurs.

In some embodiments, the bore has a diameter that is greater than a diameter or width of the groove(s) or surrounding holes. The central bore can be further divided into a plurality of axial sub-bores by one or more flat or curved vanes. The bore can be an axial bore, a helical or winding bore, a tapered bore, or have other shapes. In some embodiments, the bore includes one or more interruptions and/or reduced diameter sections along a length of the bore.

Associated aerating methods also are disclosed. In some embodiments, the aerating methods include inserting an aerator into a throat of a container, and pouring a liquid from the container through the throat of the container that includes the aerator disposed therein. The presence of the aerator in the throat of the bottle causes turbulence within the bottle thereby mixing air with the liquid. As the liquid pours through the lower portion of the aerator, the external air passes through the groove(s) and/or hole(s) located in the upper portion of the aerator to fill the gas space in the container. The liquid can be any liquid, including wine and/or a liquid having tannins and polyphenols.

The aerator can be formed from a variety of inert materials, including materials commonly used for corks. Examples of such materials include, but are not limited to, Affinity™ polyolefin plastomer available from The Dow Chemical Company of Midland, Mich., thermoplastic elastomer (TPE) containing styrene ethylene butadiene styrene (SEBS) block copolymer, thermoplastic vulcanizate (TPV), thermoplastic polyurethane (TPU), and polysilicones to list a few possibilities. The disclosed aerators also can be formed from recyclable materials allowing it to be disposed of/recycled with the bottle without requiring consumer interaction. Yet another material of choice is an aerator made with natural cellulosic materials (e.g., oak bark micro agglomerates extruded or injection molded into the aerator. The aerators also can be formed by stamping out oak or acacia wood.

The disclosed aerators can be formed from a variety of manufacturing processes such as, for example, extrusion, injection molding, and machining, and can be produced at a low cost. In pre-market implementations, the aerators can be incorporated into containers using standard bottling equipment with minimal or no modifications to the machinery.

Figure 1A:
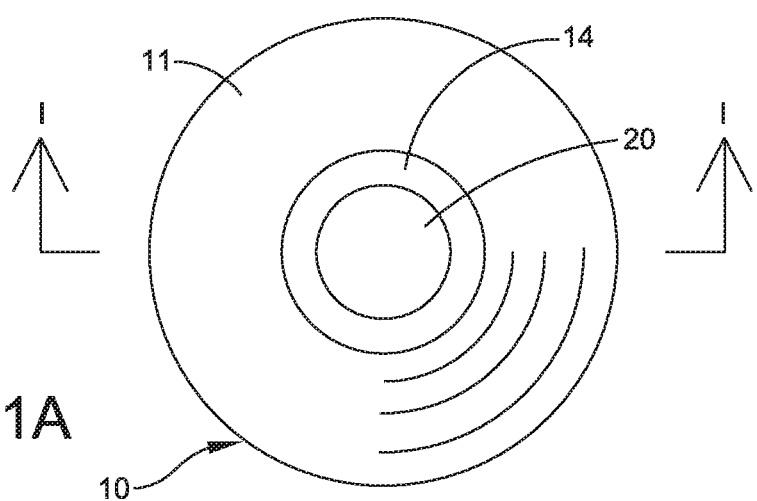
FIG. 1A is a plan view of a container system for liquids shown in FIG. 1, in accordance with some embodiments.

Referring now to the figures, and particularly to FIG. 1 which is a sectional front elevation view, taken along view 1-1 of FIG. 1A, one example of a container system 10 for liquids is shown. System 10 includes a container 11, such as a bottle, having a hollow body 12 with a neck 14. In some embodiments, the neck 14 has a cross-sectional diameter that is narrower than the cross-sectional diameter of the body 12. Container 11 is configured to house a liquid 16, such as wine or whiskey, for example. The neck 14 surrounds a hollow bore 18 that allows the liquid 16 to exit the bottle 11 via an opening at the top of the neck 14.

A cork 20 and an aerator 22 are disposed within the neck 18. As will be understood by a person of ordinary skill in the art, cork 20 is configured to provide a liquid-tight seal and be removable in order to allow the liquid 16 within container 11 to be poured out.

Aerator 22 is positioned adjacent to cork 20 within neck 18 of container 11. FIGS. 2-8 and 10 provide various views of example of an aerator in accordance with some embodiments. In the embodiment shown in FIGS. 2-8 and 10, aerator 22 includes a body 23 defining an a central axial bore 24 extending through body 23. In some embodiments, the body 23 is dimensioned to be received entirely within the neck of a wine bottle. In such instances, the outer diameter of the body 23 is between approximately 18-24 mm, and more particularly, between 19-22 mm. In some embodiments, the lengths of the body 23 is between 33-57 mm, and more particularly, between 37-47 mm. Such dimensions advantageously provide an interference or a friction fit within convention conventional wine bottles to releasably secure the aerator in place. Further, the length of the aerator is dimensioned such that the aerator can be disposed within the neck of the container while still permitting a cork to be placed in the container.

Figure 6:
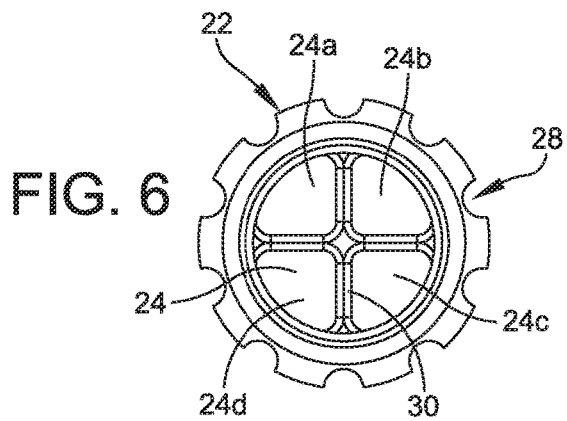
FIG. 6 is a bottom view of the aerator shown in FIG. 2, in accordance with some embodiments.
Figure 8:
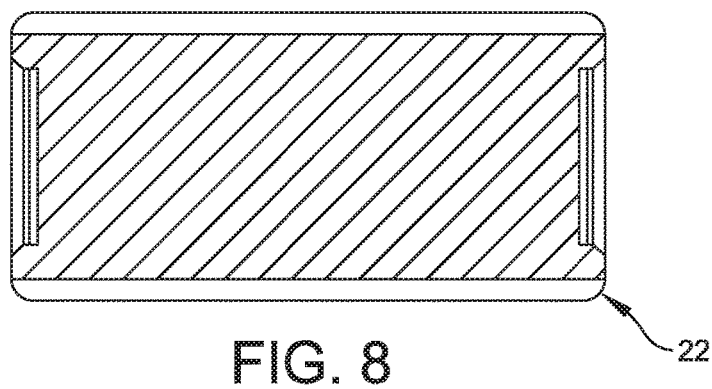
FIG. 8 is a section view taken along line VIII-VIII in FIG. 7 of the aerator shown in FIG. 2, in accordance with some embodiments.
Figure 7:
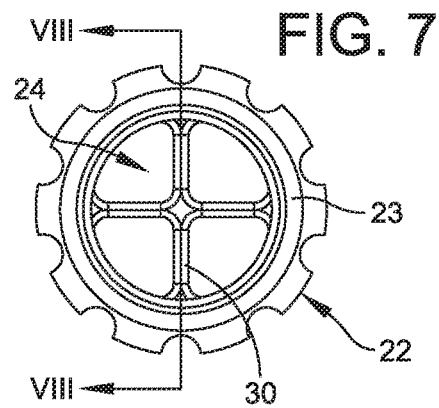
FIG. 7 is a top view of the aerator shown in FIG. 2, in accordance with some embodiments.
Figure 9:
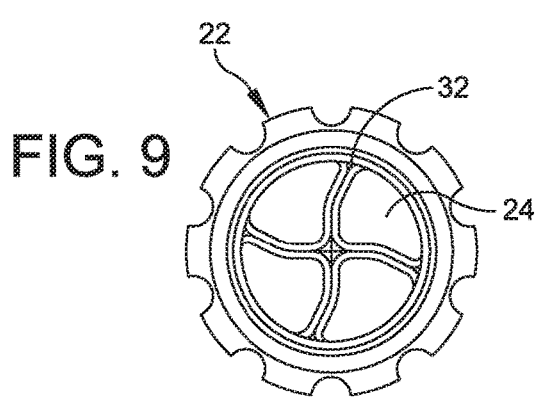
FIG. 9 is a top view of another example of an aerator, in accordance with some embodiments.
Figure 10:
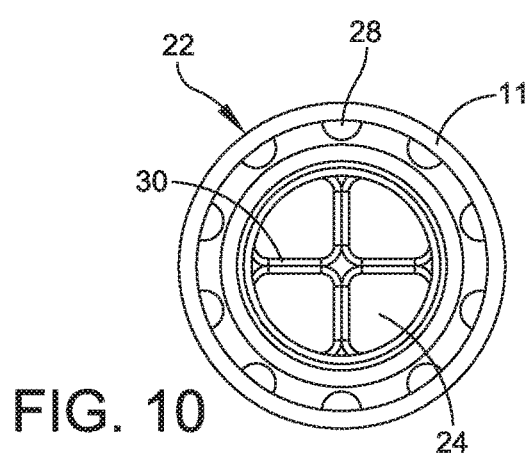
FIG. 10 is top view of an aerator as seen through the open end of a bottle, in accordance with some embodiments.

Bore 24 is divided into a plurality of separate sub-bores 24a, 24b, 24c, 24d by vanes 30 as best seen in FIGS. 6 and 7. In some embodiments, such as the embodiment shown in FIGS. 2-8 and 10, vanes 30 are straight such that they linearly extend across the diameter of bore 24. However, as shown in FIG. 9, the vanes can have a curved shape such as vanes 32. In some embodiments, the diameter of bore 24 is between approximately 10-16 mm, and more particularly, between 11-13 mm. Vanes 30, 32 interrupt the flow of liquid through bore 24 and increase the turbulence and therefore the aeration that occurs within container 11. Fewer or more vanes 30, 32 can be implemented as will be understood by one of ordinary skill in the art.

Figure 4:
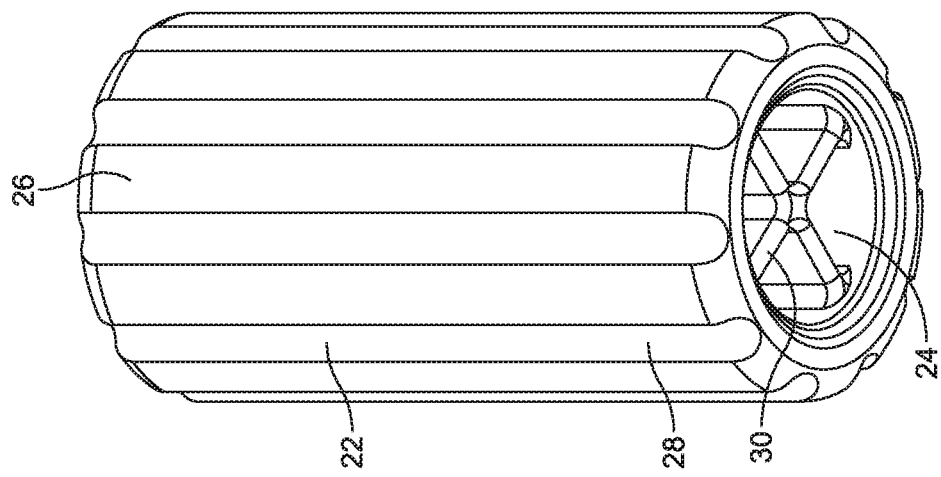
FIG. 4 is a perspective view of the bottom of the aerator shown in FIG. 2, in accordance with some embodiments.
Figure 3:
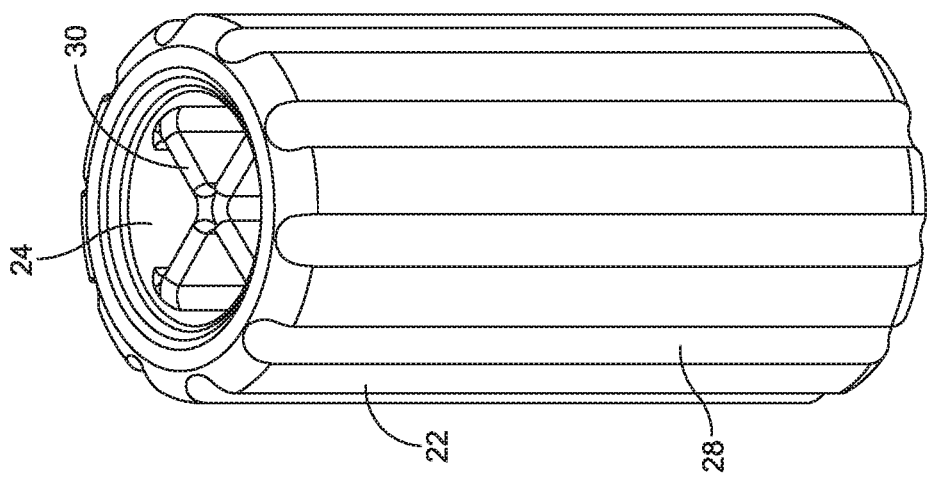
FIG. 3 is a perspective view of the top of the aerator shown in FIG. 2, in accordance with some embodiments.
Figure 2:
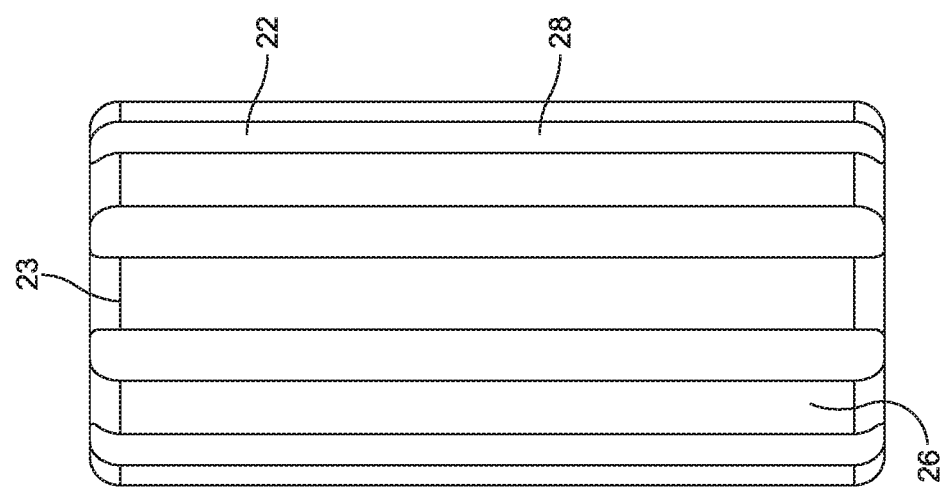
FIG. 2 is a front elevation view of one example of an aerator, in accordance with some embodiments.
Figure 5:
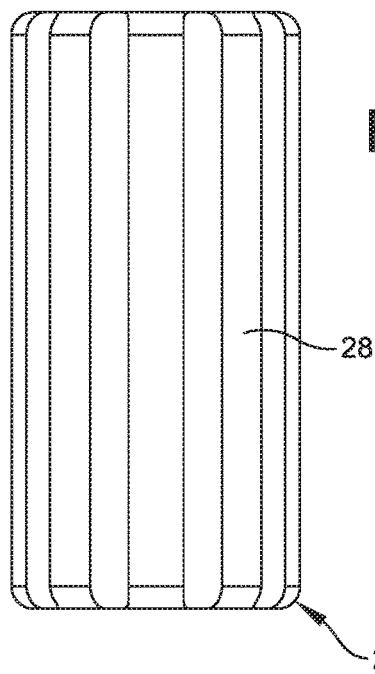
FIG. 5 is a front elevation view of the aerator shown in FIG. 2, in accordance with some embodiments.

As best seen in FIGS. 3 and 4, the outer surface 26 of aerator 22 defines a plurality of axially extending grooves 28. A person of ordinary skill in the art will understand that the number of the grooves 28 defined by the outer surface 26 of aerator can vary. In some embodiments, the grooves 28 are arranged symmetrically about the outer surface 26 of the aerator 22. Grooves 28 are shown in FIGS. 2-10 as extending parallel to the central longitudinal axis defined by body 23 of aerator 22, however, grooves 28 can take other forms. For example, in some embodiments, grooves 28 helically wrap around the body 23 from one end to the other end to provide a conduit for air or other gases to travel from one end of the body 23 to the other end as liquid is poured through bore 24.

Figure 11:
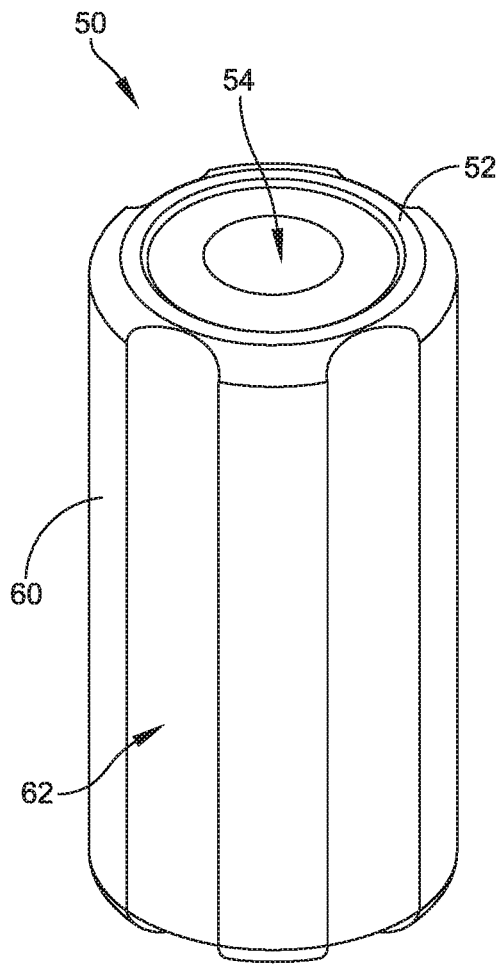
FIG. 11 is a front isometric view of another example of an aerator in accordance with some embodiments.
Figure 12:
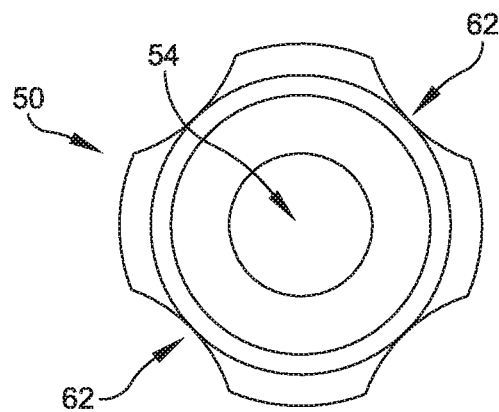
FIG. 12 is an end view of the aerator shown in FIG. 11 in accordance with some embodiments.
Figure 13:
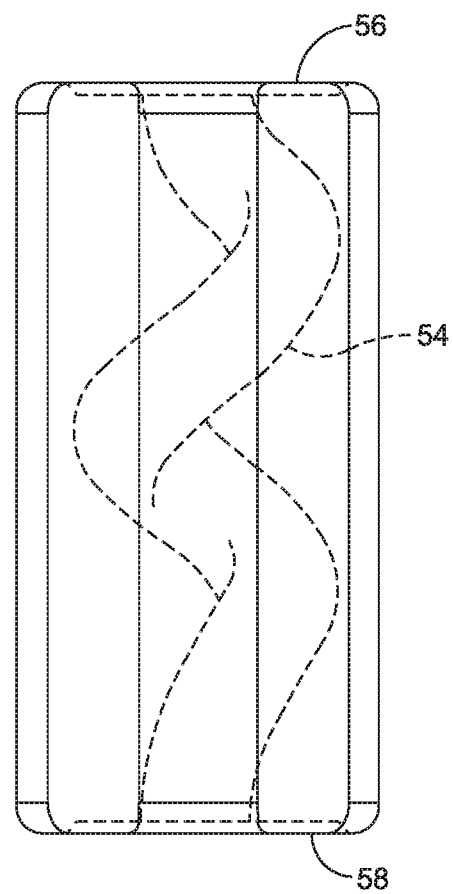
FIG. 13 is a side profile view of the aerator shown in FIG. 11 in accordance with some embodiments.

Aerators can have other configurations. For example, FIGS. 11-13 illustrate another example of an aerator 50 in accordance with some embodiments. Aerator 50 has a cylindrical body 52 defining a bore 54 extending from a first end 56 of body 52 to a second end 58 of body 52. The outer surface 60 of body 52 defines a plurality grooves 62 that extend parallel to the longitudinal axis defined by body 52. Bore 54 extends through the entirety of body 52. Although bore 54 is shown as extending axially through body 52, bore 54 can have other configurations. For example and as illustrated in FIG. 13, bore 54 helically extends through body 52. The helical configuration of bore 54 slows the flow of liquid through aerator and increases the turbulence within the container 11 and thereby increases the aeration of the liquid.

Figure 15:
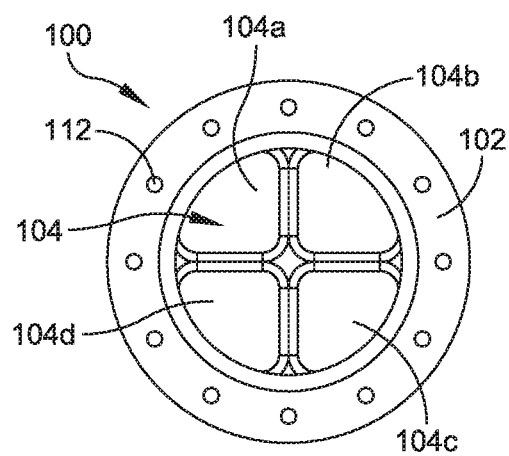
FIG. 15 is an end view of the aerator shown in FIG. 14 in accordance with some embodiments.
Figure 14:
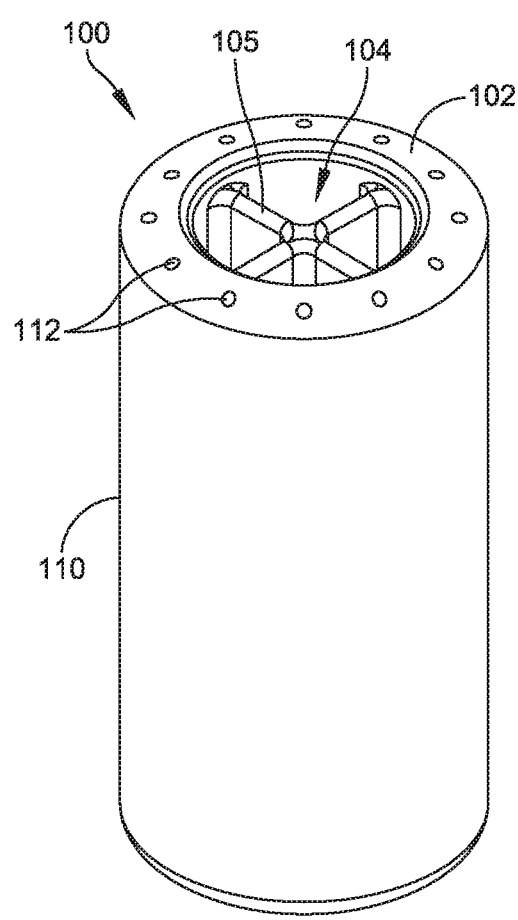
FIG. 14 is a front isometric view of another example of an aerator in accordance with some embodiments.
Figure 16:
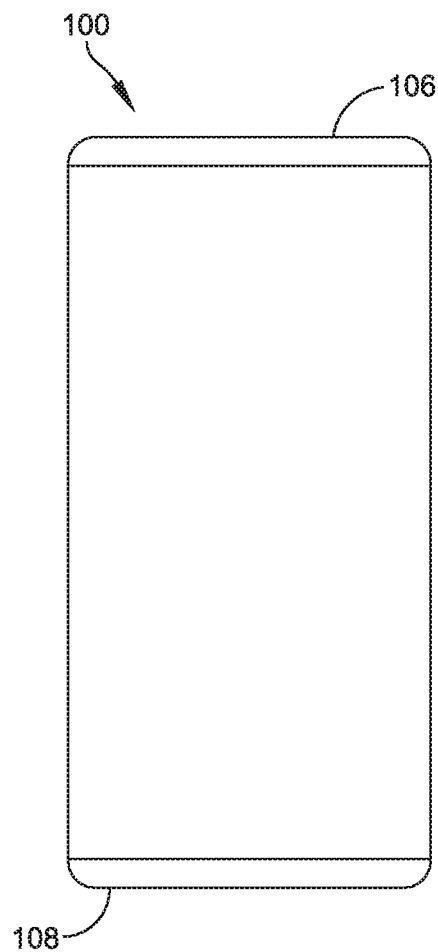
FIG. 16 is a side profile view of the aerator shown in FIG. 14 in accordance with some embodiments.

FIGS. 14-16 illustrate another example of an aerator in accordance with some embodiments. Aerator 100 includes a body 102 defining a central bore 104 extending from a first end 106 of body 102 to a second end 108 of body 102. As best seen in FIGS. 14 and 15, bore 104 is divided into a plurality of sub-bores 104a, 104b, 104c, 104d by vanes 105 that extend axially through body 102 and central bore 104. Although vanes 105 are illustrated as extending linearly across bore 104, vanes 105 can have other configurations, including being curved, as described elsewhere herein.

Body 102 includes a smooth outer surface 110 and defines a number holes 112 that are arranged around bore 104 and extend through body 102 parallel to the longitudinal axis defined by body 102. In some embodiments, holes 112 all have equal diameters that are smaller than the diameter of bore 104; however, holes 112 can have unequal diameters. Like the axial grooves formed in the outer surface of other embodiments disclosed herein, holes 112 enable gases, such as air, to pass through body 102 as liquid is being poured through bore 104.

Figure 18:
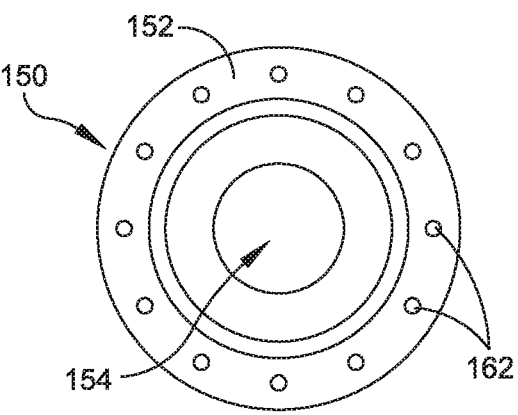
FIG. 18 is an end view of the aerator shown in FIG. 17 in accordance with some embodiments.
Figure 17:
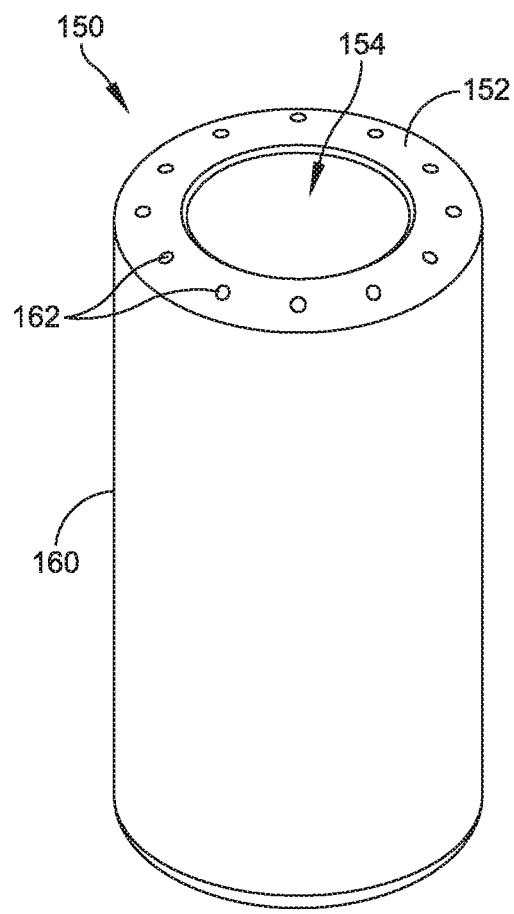
FIG. 17 is a front isometric view of another example of an aerator in accordance with some embodiments.
Figure 19:
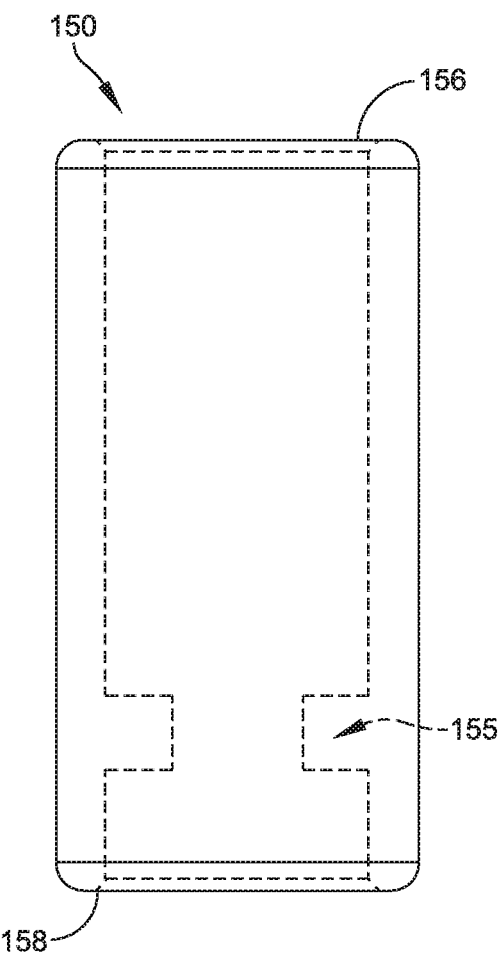
FIG. 19 is a side profile view of the aerator shown in FIG. 17 in accordance with some embodiments.

FIGS. 17-19 illustrate another example of an aerator in accordance with some embodiments. Aerator 150 includes a body 152 defining a bore 154 extending from a first end 156 to a second end 158. As best seen in FIG. 19, bore 154 includes a reduced diameter section 155 along its length. Although reduced diameter section 155 is shown as disposed adjacent to second end 158, reduced diameter section 155 can be positioned elsewhere along the length of bore 154. Further, although one reduced diameter section 155 is shown, additional reduced diameter sections or other interruptions can be provided along the length of bore 154. Reduced diameter section 155 increases the amount of turbulence within the container 11 as fluid is poured through bore 154 and thereby increases the ability of aerator 150 to aerate the liquid.

Body 152 is shown in FIGS. 17-19 as having a smooth outer surface 160, but could be configured with grooves described elsewhere herein. Body 152 defines one or more or a plurality of holes 162 extending through body 152. In some embodiments, holes 162 are arranged symmetrically about bore 154. Holes 160 can all have an equal diameter or can have an unequal diameter. In some embodiments, holes 160 have a smaller diameter than the diameter of bore 154, including the diameter of the reduced diameter section 155. Holes 160 enable air to pass through body 152 as liquid is passing through bore 154.

Figure 20:
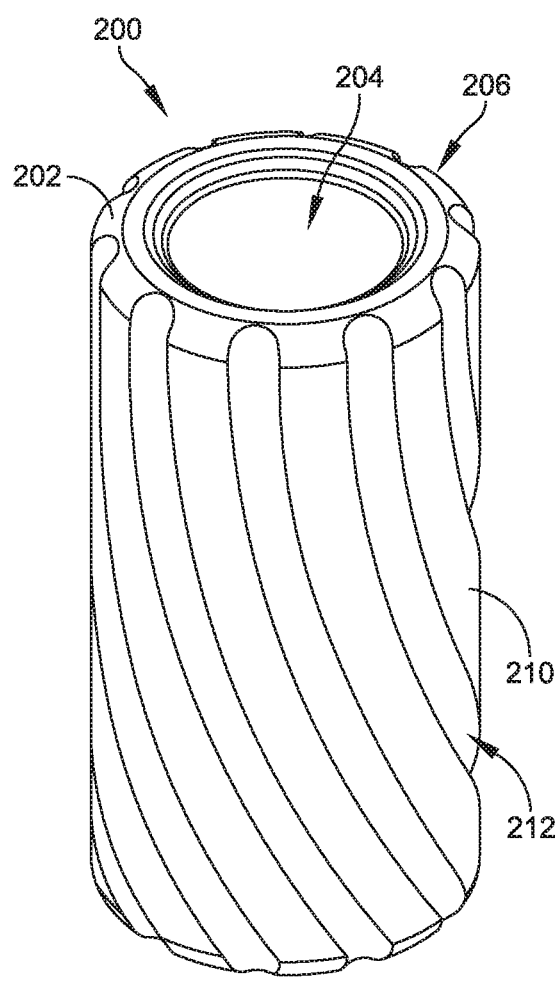
FIG. 20 is a front isometric view of another example of an aerator in accordance with some embodiments.
Figure 21:
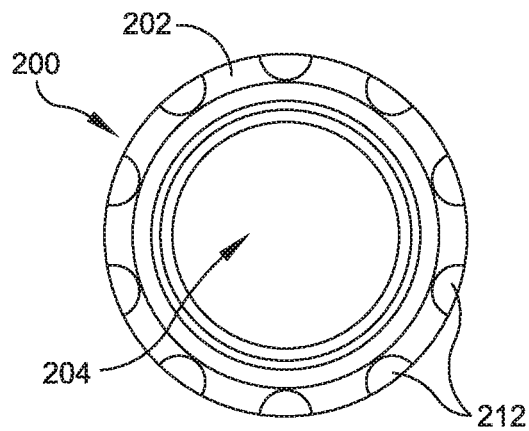
FIG. 21 is an end view of the aerator shown in FIG. 20 in accordance with some embodiments.
Figure 22:
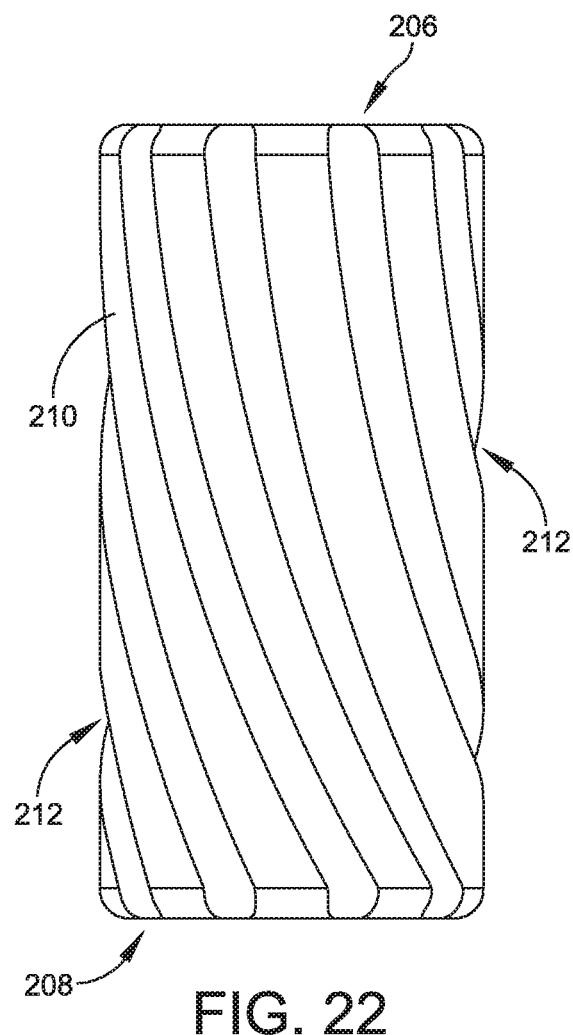
FIG. 22 is a side profile view of the aerator shown in FIG. 20 in accordance with some embodiments.

FIGS. 20-22 illustrate another example of an aerator in accordance with some embodiments. Aerator 200 includes a body 202 defining a bore 204 extending from a from a first end 206 to a second end 208. Bore 204 can extend continuously through body 202 or can include one or more reduced diameter sections along its length as described elsewhere herein. Further, one or more vanes can be provided along bore 204 to provide any number of sub-bores.

Body 202 has an outer surface 210 defining one or more grooves that extend from the first end 206 of body 202 to the second end 208 of body. As best seen in FIGS. 20 and 22, grooves 212 curve as they extend from first end 206 to the second end 208. The curvature, width, depth, and number of grooves 212 can vary as will be understood by one of ordinary skill in the art. Grooves 212 enable air to pass from one end of body 202, e.g., first end 206, to the other end of body 202, e.g., second end 208, while liquid is being poured through bore 204.

By residing in the neck of the bottle, the present device regulates the flow of air entering the bottle, inducing bubbles which accelerate oxidation as well as introduce agitation to the wine as it enters the center chamber. The chambered center opening further splits the volume of wine exiting the bottle into multiple streams. These streams recombine during the pour, further increasing agitation and oxidation of the liquid. The device requires no input or interaction with the end user and is disposed of once the bottle is empty.

In some embodiments, an apparatus includes a body having a length extending from a first end to a second end. The body defines a bore extending through the entirety of the body and at least one of a plurality of grooves or holes around the bore. The body has a length that is dimensioned to be received entirely within a neck of a container.

In some embodiments, a system includes a container including a neck and an aerator disposed entirely within the container and at least partially within the neck. The aerator includes a body having a length extending from a first end to a second end. The body defines a bore extending through the entirety of the body and at least one of a plurality of grooves or holes around the bore.

In some embodiments, the container is a wine bottle.

In some embodiments, the bore includes a reduced diameter section along a length of the bore.

In some embodiments, the bore helically extends through the body.

In some embodiments, the bore includes at least one interruption disposed along a length of the bore.

In some embodiments, the body defines a plurality of grooves that extend non-linearly from the first end of the body to the second end of the body.

In some embodiments, the body defines a plurality of holes that extend from the first end of the body to the second end of the body parallel to the bore. Each of the plurality of holes has a diameter that is less than a diameter of the bore.

In some embodiments, the bore includes a taper.

In some embodiments, the aerator is disposed at least partially within the neck of the container via an interference fit.

In some embodiments, the aerator is disposed at least partially within the neck of the container via a friction fit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An aerator, comprising:
a body having a length extending from a first end to a second end, the body dimensioned to be received entirely within a neck of a container and defining:
a bore extending through the body from the first end to the second end, and
a plurality of holes extending through the body and completely encircled by material of the body from the first end to the second end, the plurality of holes being located around the bore.

2. The aerator of claim 1, wherein the bore includes a reduced diameter section along a length of the bore.

3. The aerator of claim 1, wherein the bore includes at least one interruption disposed along the length of the bore.

4. The aerator of claim 1, wherein the bore includes a taper.

5. The aerator of claim 1, wherein the plurality of holes are symmetrically arranged around the bore.

6. The aerator of claim 5, wherein each hole of the plurality of holes has a diameter that is smaller diameter than a diameter of the bore.

7. The aerator of claim 1, wherein each hole in the plurality of holes has a diameter that is smaller than a diameter of the bore.

8. The aerator of claim 1, wherein each hole of the plurality of holes has a same diameter.

9. A system, comprising:
a container including a neck; and
an aerator disposed entirely within the container and at least partially within the neck, the aerator including a body having a length extending from a first end to a second end, the body defining:
a central bore extending through the body from the first end to the second end, and
a plurality of holes extending through the body and completely encircled by material of the body from the first end to the second end, the plurality of holes being located around the bore.

10. The system of claim 9, wherein the container is a wine bottle.

11. The system of claim 9, wherein the length of the body is dimensioned to be received entirely within the neck of the container.

12. The system of claim 9, wherein the bore includes a reduced diameter section along a length of the bore.

13. The system of claim 9, wherein the bore includes at least one interruption disposed along the length of the bore.

14. The system of claim 9, wherein the bore includes a taper.

15. The system of claim 9, wherein the plurality of holes are symmetrically arranged around the bore.

16. The system of claim 9, wherein each hole of the plurality of holes has a diameter that is smaller than a diameter of the bore.

17. The system of claim 9, wherein each hole of the plurality of holes has the same diameter.

18. An aerator, comprising:
a body having a length extending from a first end to a second end, the body defining:
a central bore extending through the body from the first end to the second end, and
a plurality of holes extending through the body and completely encircled by material of the body from the first end to the second end, the plurality of holes located around the central bore.

19. The aerator of claim 18, wherein the length of the body is dimensioned to be received entirely within a neck of a container.

20. The aerator of claim 18, wherein the body includes at least one vane that divides the central bore into a plurality of sub-bores.

* * * * *